(12) United States Patent
Zhang et al.

(10) Patent No.: US 12,039,711 B2
(45) Date of Patent: Jul. 16, 2024

(54) WHITE BALANCE ABNORMALITY DETERMINATION METHOD AND APPARATUS, STORAGE MEDIUM, AND ELECTRONIC DEVICE

(71) Applicant: ZHEJIANG UNIVIEW TECHNOLOGIES CO., LTD., Zhejiang (CN)

(72) Inventors: Wenping Zhang, Hangzhou (CN); Qiong Xu, Hangzhou (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 384 days.

(21) Appl. No.: 17/631,867

(22) PCT Filed: Mar. 30, 2020

(86) PCT No.: PCT/CN2020/082099
§ 371 (c)(1),
(2) Date: Jan. 31, 2022

(87) PCT Pub. No.: WO2021/022820
PCT Pub. Date: Feb. 11, 2021

(65) Prior Publication Data
US 2022/0284564 A1    Sep. 8, 2022

(30) Foreign Application Priority Data

Aug. 2, 2019   (CN) .......................... 201910712098.6

(51) Int. Cl.
*G06T 7/00*   (2017.01)
*G06T 7/90*   (2017.01)

(52) U.S. Cl.
CPC .............. *G06T 7/0002* (2013.01); *G06T 7/90* (2017.01); *G06T 2207/10024* (2013.01); *G06T 2207/30168* (2013.01)

(58) Field of Classification Search
CPC ..................... G06T 7/0002; G06T 7/90; G06T 2207/10024; G06T 2207/30168;
(Continued)

(56) References Cited

U.S. PATENT DOCUMENTS 8,363,932 B2 * 1/2013 Lee .......................... G06T 5/20
                                                              382/162
9,390,475 B2 * 7/2016 Zhou ...................... H04N 23/71
(Continued)

FOREIGN PATENT DOCUMENTS

CN      105654520 A     6/2016
CN      105898230 A     8/2016
(Continued)

OTHER PUBLICATIONS

International Search Report, issued from the International Search Authority, to International Application No. PCTCN2020082099, mailed on Jun. 22, 2020, 4 pages.
(Continued)

*Primary Examiner* — Bobbak Safaipour
(74) *Attorney, Agent, or Firm* — Hunton Andrews Kurth LLP (57) ABSTRACT

Provided are a white balance abnormality determination method and apparatus, a storage medium, and an electronic device. The method includes: acquiring at least one target block in a first channel image, and acquiring at least one reference block in a second channel image for each target block, where the first channel image is adjacent to the second channel image; determining a color feature representative value of each target block and a color feature representative value of each reference block associated with a position of a respective target block; determining, a color feature difference value between the first channel image and the second channel image; determining whether a white balance abnormality image exists in the first channel image and the second channel image; and in a case where a white balance abnormality image exists in the first channel image and the second channel image, adjusting the white balance abnormality image.

20 Claims, 5 Drawing Sheets

(58) Field of Classification Search
CPC ...... H04N 1/3876; H04N 1/6077; H04N 9/73; H04N 23/698; H04N 23/88; H04N 23/10
See application file for complete search history.

(56) References Cited

U.S. PATENT DOCUMENTS

| | | | |
|---|---|---|---|
| 2016/0071244 A1 | 3/2016 | Huang et al. | |
| 2017/0132820 A1 | 5/2017 | Zhou | |
| 2017/0163952 A1* | 6/2017 | Wang | H04N 23/88 |
| 2018/0330481 A1 | 11/2018 | Watanabe et al. | |
| 2019/0172186 A1* | 6/2019 | Liu | G06T 5/90 |

FOREIGN PATENT DOCUMENTS

| | | |
|---|---|---|
| CN | 106303483 A | 1/2017 |
| CN | 106937102 A | 7/2017 |
| CN | 108462866 A | 8/2018 |
| CN | 108833874 A | 11/2018 |
| CN | 110009701 A | 7/2019 |

OTHER PUBLICATIONS

European Search Report issued in European Application No. 20850622.0 dated May 15, 2023.

* cited by examiner

WHITE BALANCE ABNORMALITY DETERMINATION METHOD AND APPARATUS, STORAGE MEDIUM, AND ELECTRONIC DEVICE

CROSS-REFERENCE TO RELATED APPLICATIONS

This is a National Stage Application filed under 35 U.S.C. 371 based on International Patent Application No. PCT/CN2020/082099, filed on Mar. 30, 2020, which claims priority to Chinese Patent Application No. 201910712098.6 filed on Aug. 2, 2019, the disclosures of both of which are incorporated herein by reference in their entireties.

TECHNICAL FIELD

The present application relates to the field of image processing, for example, a white balance abnormality determination method and apparatus, a storage medium, and an electronic device.

BACKGROUND

With the continuous progress of science and technology, the image acquisition system has developed rapidly. In order to satisfy the needs of practical use and reduce hardware costs, more and more real-time monitoring devices have changed from the previous single-camera mode to multi-camera mode. After each camera in the multi-camera mode acquires a certain range of images, the image display of a wider range of scenes and even the panoramic image display can be implemented through the image integration technology.

However, in the process of using a multi-ocular camera, due to the tooling difference of optical devices such as lens of each camera and different shooting angles, one channel of images of the multi-ocular camera may easily undergo abnormal white balance, which has a certain impact on the display effect of multi-channel images. The ability to quickly and accurately determine images having abnormal white balance in multi-channel images is the key factor in improving the display effect of multi-channel images.

SUMMARY

Embodiments of the present application provide a white balance abnormality determination method and apparatus, a storage medium, and an electronic device, which can achieve the effect of quickly and accurately determining white balance abnormality images in the multi-channel image and the effect of supplementarily adjusting white balance abnormality channel images, thereby ensuring the consistency of image effects after multi-channel image splicing.

The embodiments of the present application provide a white balance abnormality determination method. The method includes the steps described below.

At least one target block in a first channel image is acquired, and at least one reference block in a second channel image is acquired for each target block, where the at least one reference block is associated with a position of a respective target block, and the first channel image is adjacent to the second channel image.

A color feature representative value of each target block and a color feature representative value of each reference block associated with the position of the respective target block are determined.

A color feature difference value between the first channel image and the second channel image is determined according to a difference between the color feature representative value of each target block and the color feature representative value of each reference block associated with the position of the respective target block.

Whether a white balance abnormality image exists in the first channel image and the second channel image is determined according to a magnitude relationship between the color feature difference value and a preset threshold, and in a case where a white balance abnormality image exists in the first channel image and the second channel image, the white balance abnormality image is adjusted.

The embodiments of the present application provide a white balance abnormality determination apparatus. The apparatus includes a target block acquisition module, a color feature representative value determination module, a color feature difference value determination module, and a white balance abnormality processing module.

The target block acquisition module is configured to acquire at least one target block in a first channel image, and acquire at least one reference block in a second channel image for each target block, where the at least one reference block is associated with a position of a respective target block, and the first channel image is adjacent to the second channel image.

The color feature representative value determination module is configured to determine a color feature representative value of each target block and a color feature representative value of each reference block associated with the position of the respective target block.

The color feature difference value determination module is configured to determine, according to a difference between the color feature representative value of each target block and the color feature representative value of each reference block associated with the position of the respective target block, a color feature difference value between the first channel image and the second channel image.

The white balance abnormality processing module is configured to determine, according to a magnitude relationship between the color feature difference value and a preset threshold, whether a white balance abnormality image exists in the first channel image and the second channel image, and in a case where a white balance abnormality image exists in the first channel image and the second channel image, adjust the white balance abnormality image.

The embodiments of the present application provide a non-transitory computer-readable storage medium. The computer-readable storage medium stores a computer program, where the program, when executed by a processor, performs the white balance abnormality determination method described in the embodiments of the present application.

The embodiments of the present application provide an electronic device. The electronic device includes a memory, a processor, and a computer program stored in the memory and executable by the processor. The processor performs the white balance abnormality determination method described in the embodiments of the present application when executing the computer program.

DETAILED DESCRIPTION

The present application is described below in conjunction with drawings and embodiments. The embodiments described herein are intended to explain and not to limit the present application. For ease of description, only part, not all, of structures related to the present application are illustrated in the drawings.

Before exemplary embodiments are discussed, it is to be noted that some of the exemplary embodiments are described as processes or methods depicted in flowcharts. Although the flowcharts describe the steps as sequentially processed, many of the steps may be implemented concurrently, coincidently or simultaneously. Additionally, the sequence of the steps may be rearranged. Each of the processes may be terminated when the operations are completed, but may further have additional steps not included in the drawings. Each of the processes may correspond to one of a method, a function, a procedure, a subroutine, a subprogram, and the like.

Figure 1:
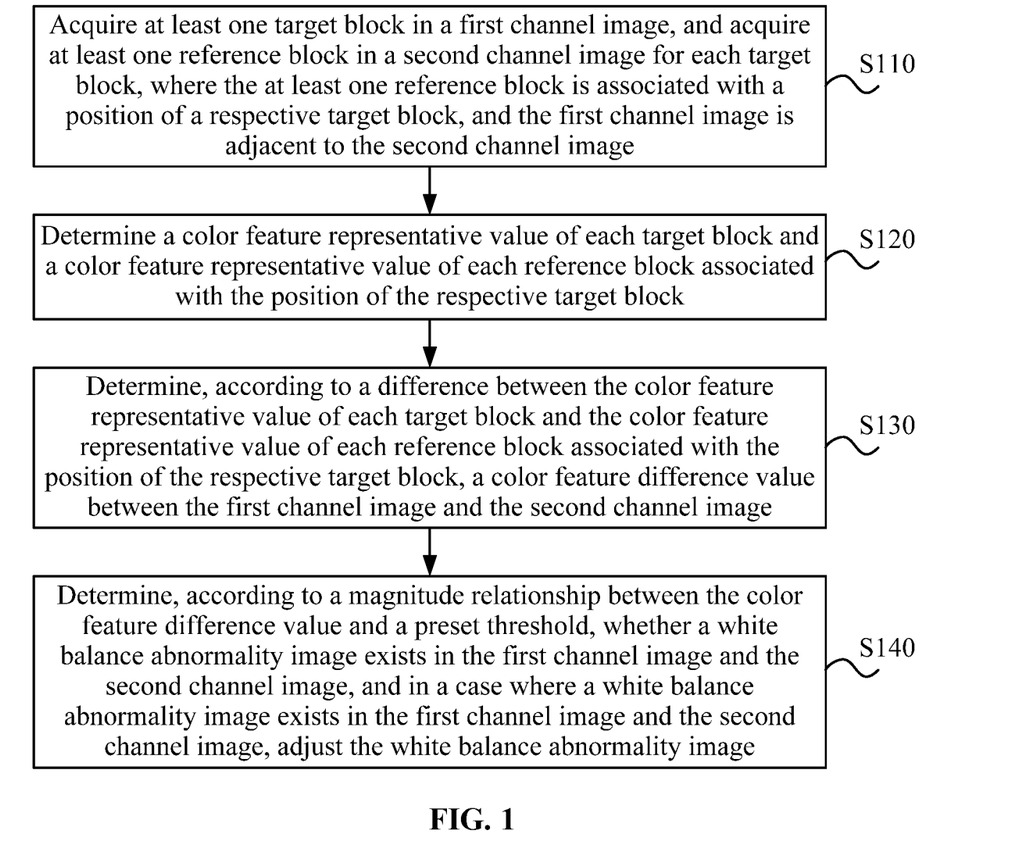
FIG. 1 is a flowchart of a white balance abnormality determination method according to an embodiment of the present application.

FIG. 1 is a flowchart of a white balance abnormality determination method according to an embodiment of the present application. The method can be applied to the case of identifying white balance abnormality of images. The method can be performed by a white balance abnormality determination apparatus, and the apparatus can be implemented by software and/or hardware and that can be integrated into an electronic device such as a smart terminal.

As shown in FIG. 1, the white balance abnormality determination method includes S110, S120, S130, and S140.

In S110, at least one target block in a first channel image is acquired, and at least one reference block in a second channel image is acquired for each target block, where each reference block is associated with the position of a respective target block, and the first channel image is adjacent to the second channel image.

The first channel image being adjacent to the second channel image may mean that the contents in the first channel image and the contents in the second channel image may be spliced to form a complete image. First, at least one target block may be acquired from the first channel image. The target block may be an image block of a preset shape, the preset shape, for example, may be a circle, a rectangle or a square, and in this embodiment, the preset shape may be set to a rectangle. The position of each target block may be set nearby or adjacent to the second channel image. After at least one target block is obtained, reference blocks associated with the position of each target block may be determined from the second channel image. The position association may be reflected in the distance between the reference block and the target block, and for example, the determined reference block may be a reference block closest to the target block. One reference block may be set for one target block, or two or three reference blocks may be set for one target block. The above-described arrangement has the advantage that in a case where the image in one reference block is different from the image content of the target block, the information of another reference block may be used, or the information of multiple reference blocks may be used for weighted calculation, so that the obtained result has higher accuracy and better robustness.

In S120, a color feature representative value of each target block and a color feature representative value of each reference block associated with the position of the respective target block are determined.

The color feature representative value of a target block may be an average value of color values of all pixels in the target block, such as the average value of values of red (R), green (G), and blue (B) primary colors of all pixels in the target block, and the color feature representative value may be determined in other manners. After the color feature representative value of a target block is determined, the color feature representative values of one or more reference blocks associated with the target block may be determined in the same manner.

In S130, a color feature difference value between the first channel image and the second channel image is determined according to a difference between the color feature representative value of each target block and the color feature representative value of each reference block associated with the position of the respective target block.

The color feature difference value between the first channel image and the second channel image may be determined according to the difference between the color feature representative value of each target block and the color feature representative value of the corresponding reference block.

For example, according to the difference value between the color feature representative value of each target block and the color feature representative value of a corresponding reference block associated with the position of each target block, all difference values between the target blocks and the reference blocks are accumulated to determine the color feature difference value between the first channel image and the second channel image.

In S140, whether a white balance abnormality image exists in the first channel image and the second channel image is determined according to a magnitude relationship between the color feature difference value and a preset threshold, and in a case where a white balance abnormality image exists in the first channel image and the second channel image, the white balance abnormality image is adjusted.

The preset threshold may be determined according to prior statistics of a large number of images of two adjacent channels, and may be a value representing the color feature difference of the images of the two channels. After the color feature difference value between the first channel image and the second channel image is determined, the difference value may be compared with a preset threshold. If the difference value exceeds the preset threshold, it is determined that white balance abnormality exists between the images of the two channels, and it may be further determined the image of which channel image is the white balance abnormality image. For example, there is a wide-angle image consisting of images of four channels, which are a first channel image, a second channel image, a third channel image and a fourth channel image sequentially from left to right. After it is determined that a white balance abnormality image exists between the first channel image and the second channel image, it is determined whether a white balance abnormality image exists between the second channel image and the third channel image, and if no white balance abnormality image exists between the second channel image and the third channel image, it can be determined that the first channel image is the white balance abnormality image. The images are compared sequentially from left to right to determine the white balance abnormality image among multiple channels. After the white balance abnormality image is determined, the parameters of the camera that shoots this image are adjusted so that the white balance of the image shot by the camera is consistent with that of images shot by other cameras, thereby improving the image acquisition effect.

In the technical solution provided by this embodiment of the present application, at least one target block in a first channel image is acquired, and at least one reference block in a second channel image is acquired for each target block, where each reference block is associated with the position of a respective target block, and the first channel image is adjacent to the second channel image; a color feature representative value of each target block and a color feature representative value of each reference block associated with the position of the respective target block are determined; a color feature difference value between the first channel image and the second channel image is determined according to a difference between the color feature representative value of each target block and the color feature representative value of each reference block associated with the position of the respective target block; and whether a white balance abnormality image exists in the first channel image and the second channel image is determined according to a magnitude relationship between the color feature difference value and a preset threshold, and in a case where a white balance abnormality image exists in the first channel image and the second channel image, the white balance abnormality image is adjusted. Through the technical solution provided by the present application, the effect of quickly and accurately determining white balance abnormality images in the multi-channel image can be achieved, and the effect of supplementarily adjusting white balance abnormality channel images can be achieved, thereby ensuring the consistency of image effects after multi-channel image splicing.

Figure 2:
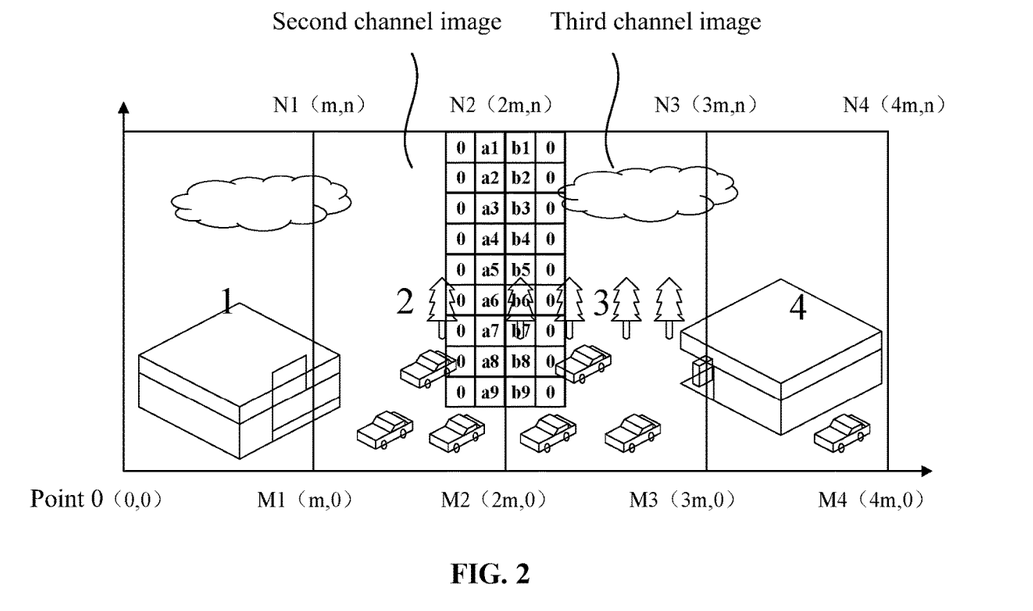
FIG. 2 is a schematic diagram of a position relationship between target blocks and reference blocks according to an embodiment of the present application.

FIG. 2 is a schematic diagram of a position relationship between target blocks and reference blocks according to an embodiment of the present application. As shown in FIG. 2, the connecting line between the point M2 and the point N2 is an adjacent line between the second channel image and the third channel image. The target blocks in the second channel image may be set at a position adjacent to the adjacent line. In an embodiment, the image blocks may be set in two columns, and when the image block a2 in the second channel image is the target block, the image blocks b1, b2 and b3 and the image block on the right of b2, which are closest to the target block a2 in the third channel image, may be selected as reference blocks. In this manner, among the image blocks already determined, once the position of the target block and the number of reference blocks of the target block are determined, the position of the reference blocks may be determined. The advantage of selecting the target block and the reference block according to the distance is that the image contents of the two blocks are more likely to represent the same content, for example, the contents of the target block a2 and the reference block b2 are both blue sky, and with the same contents, whether there is a white balance difference between the two blocks can be determined more accurately.

Figure 3:
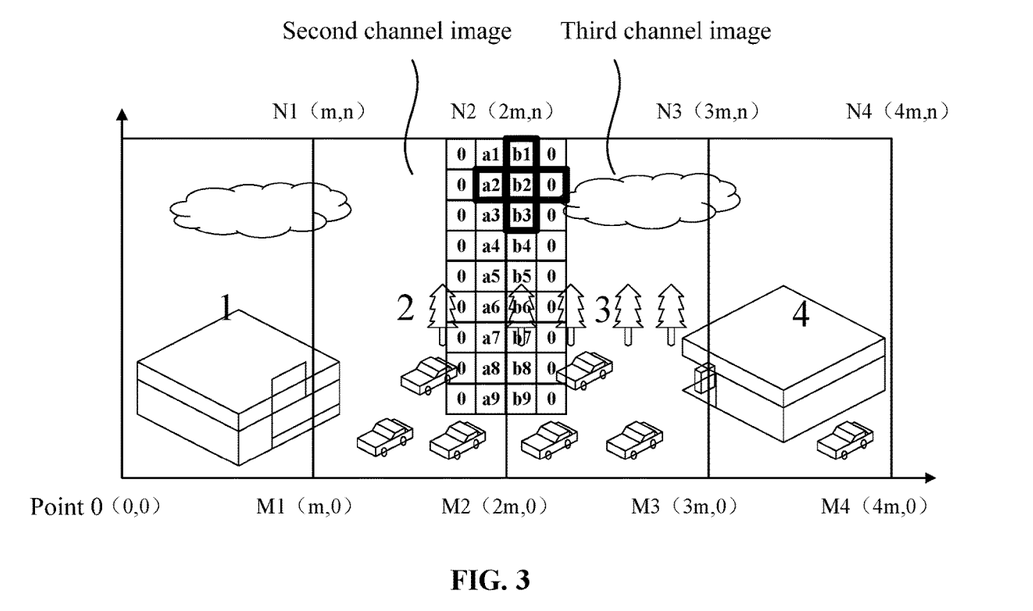
FIG. 3 is a schematic diagram of the selection effect of target blocks and reference blocks according to an embodiment of the present application.

FIG. 3 is a schematic diagram of the selection effect of target blocks and reference blocks according to an embodiment of the present application. When the image block a2 in the second channel image is the target block, the image blocks b1, b2 and b3 and the image block on the right of b2, which are closest to the target block a2 in the third channel image, may be selected as reference blocks.

Figure 4:
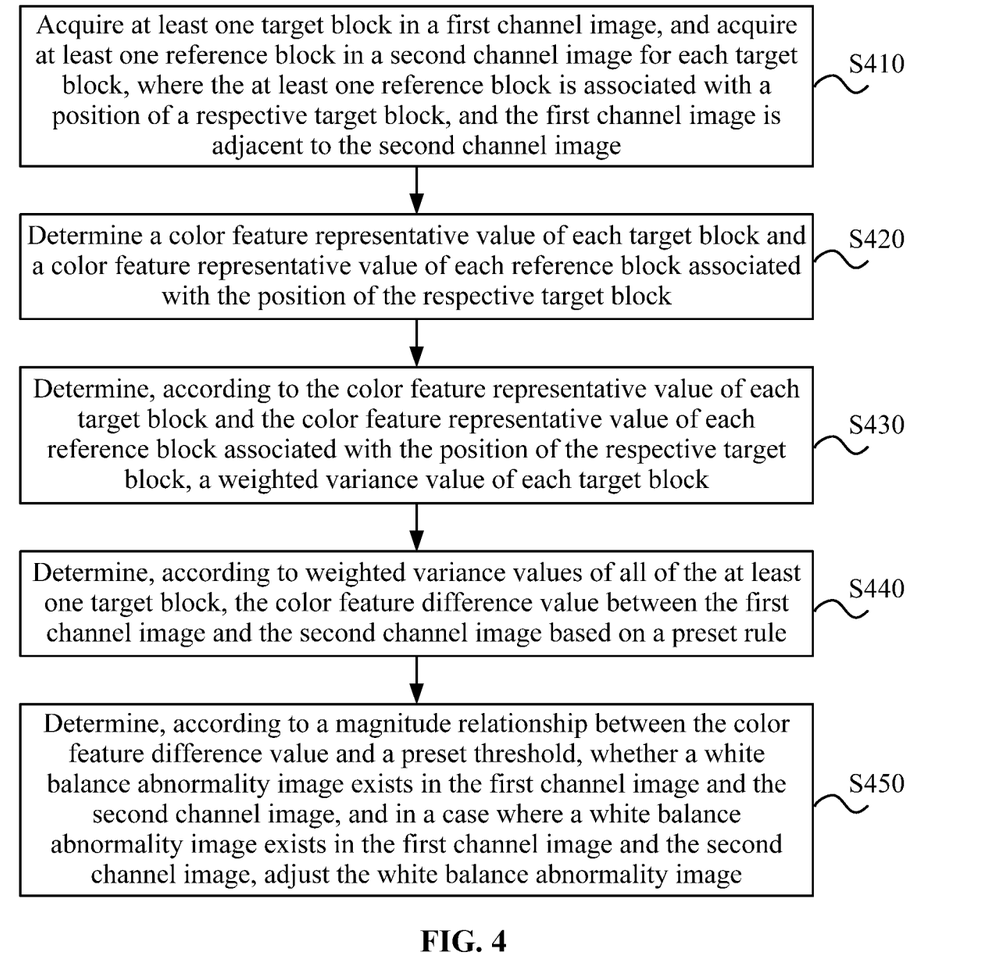
FIG. 4 is a flowchart of another white balance abnormality determination method according to an embodiment of the present application.

FIG. 4 is a flowchart of another white balance abnormality determination method according to an embodiment of the present application. As shown in FIG. 4, the method includes S410, S420, S430, S440, and S450.

In S410, at least one target block in a first channel image is acquired, and at least one reference block in a second channel image is acquired for each target block, where the at least one reference block is associated with a position of a respective target block, and the first channel image is adjacent to the second channel image.

In S420, a color feature representative value of each target block and a color feature representative value of each reference block associated with the position of the respective target block are determined.

In S430, a weighted variance value of each target block is determined according to the color feature representative value of each target block and the color feature representative value of each reference block associated with the position of the respective target block.

For example, when the color feature representative value of each target block is P and the color feature representative value of the reference block associated with each target block is Q, the resulting variance value of each target block may be $(P-Q)^2$. In the above-described example, the number of the reference block of the target block is one. When the number of reference blocks of the target block is multiple, variance values may be calculated for multiple reference blocks respectively, and then the variance values are accumulated to obtain a weighted variance value. For example, if each target block corresponds to four reference blocks, the weighted variance value of the target block is $$\sum_{i=1}^{4} k_i (P - Q_i)^2,$$

where $k_i$ is a weighting coefficient of an $i^{th}$ reference block, and i is equal to 1, 2, 3 or 4.

In S440, the color feature difference value between the first channel image and the second channel image is determined according to weighted variance values of all of the at least one target block based on a preset rule.

The color feature difference value between the first channel image and the second channel image may be obtained by accumulating the obtained weighted variance values of all the target blocks or by calculating the average value of the obtained weighted variance values.

In S450, whether a white balance abnormality image exists in the first channel image and the second channel image is determined according to a magnitude relationship between the color feature difference value and a preset threshold, and in a case where a white balance abnormality image exists in the first channel image and the second channel image, the white balance abnormality image is adjusted.

On the basis of the preceding technical solution, the technical solution herein provides a method for determining a color feature difference value between two channel images based on a weighted variance value of each target block. The above-described arrangement has the advantage that the difference between two channel images can be represented by the difference between the target block and the reference block, so that the determination result of whether a white balance difference exists between two channel images is more accurate.

Figure 5:
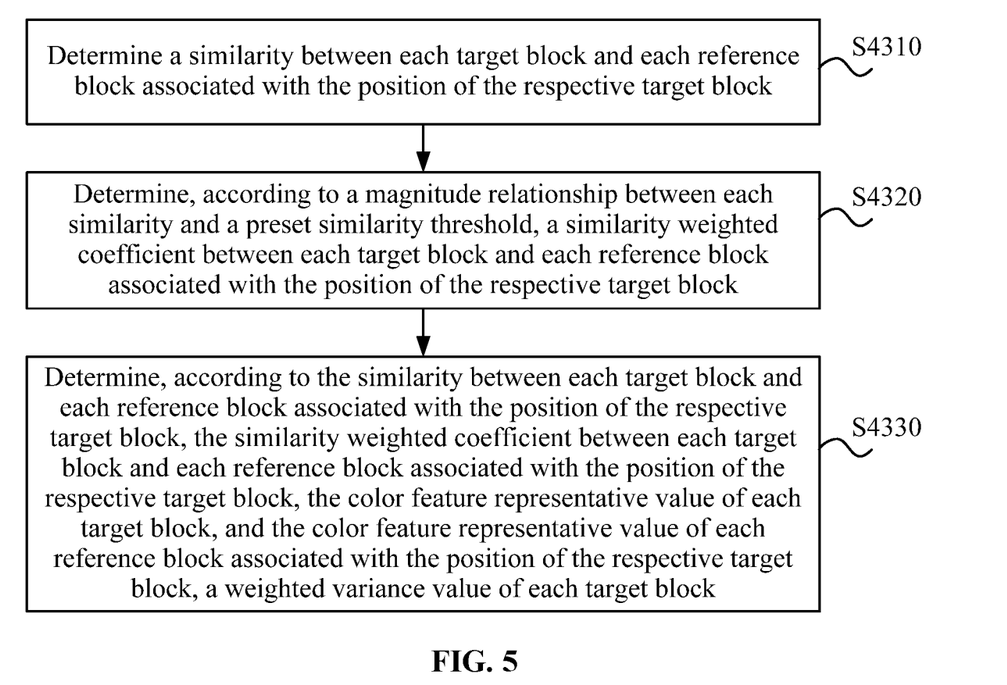
FIG. 5 is a flowchart of another white balance abnormality determination method according to an embodiment of the present application.

FIG. 5 is a flowchart of another white balance abnormality determination method according to an embodiment of the present application. FIG. 5 is the illustration of S430 in FIG. 4, and as shown in FIG. 5, S430 includes S4310, S4320 and S4330.

In S4310, a similarity between each target block and each reference block associated with the position of the respective target block is determined.

The similarity may be expressed by S, and if one target block corresponds to multiple reference blocks, the similarity between each reference block and the target block may be determined. The similarity may be determined by image recognition, grayscale histogram extraction and other methods, may be calculated according to object characteristics, brightness information, color information and other information, and may also be calculated by deep learning, which will not be repeated here.

In S4320, a similarity weighted coefficient between each target block and each reference block associated with the position of the respective target block is determined according to a magnitude relationship between each similarity and a preset similarity threshold.

After the similarity is determined, the similarity weighted coefficient of each reference block may be determined by using the magnitude relationship between the similarity and the preset similarity threshold, and the similarity weighted coefficient be expressed by F. For example, the similarity threshold is 0.8, and if the similarity between the reference block and the target block exceeds 0.8, the similarity weighted coefficient is 1, and if the similarity between the reference block and the target block does not exceed 0.8, the similarity weighted coefficient is 0.

In S4330, a weighted variance value of each target block is determined according to the similarity between each target block and each reference block associated with the position of the respective target block, the similarity weighted coefficient between each target block and each reference block associated with the position of the respective target block, the color feature representative value of each target block, and the color feature representative value of each reference block associated with the position of the respective target block.

After the relationship between the similarity S and the similarity weighted coefficient F is determined, the weighted variance value of the target block may be determined based on the relationship. For example, the weighted variance value may be $$\sum_{i=1}^{4} k_i F_i S_i (P - Q_i)^2,$$

where $k_i$ is a weighted coefficient of an $i^{th}$ reference block, $F_i$ is a similarity weighted coefficient of the $i^{th}$ reference block, $S_i$ is the similarity between the target block and the $i^{th}$ reference block, and i is equal to 1, 2, 3 or 4. The above-described arrangement has the advantage that the reference block with high similarity to the target block can be used as the main judgment basis.

Through the above-described technical solution, the accuracy of the determination result of the weighted variance value of the target block can be improved, and the weighted variance value can be calculated by using the reference block related to the content of the target block, so that the obtained result is more in line with the reality.

On the basis of the above-described technical solution, in an embodiment, the step that the color feature difference value between the first channel image and the second channel image is determined according to weighted variance values of all of the at least one target block based on a preset rule includes the following step: the weighted variance values of all of the at least one target block are subjected to weighted accumulation, and a result of the weighted accumulation is taken as the color feature difference value between the first channel image and the second channel image. After the weighted variance values of multiple target blocks are obtained, the weighted variance values may be accumulated to obtain the color feature difference value between two channel images. The above-described arrangement has the advantage that the white balance difference degree between images of the two channels can be determined according to the difference between the target block and the reference block, and since the positions and contents of the target block and the reference block are interrelated, the determination result can be more accurate.

On the basis of the above-described technical solution, in an embodiment, after it is determined that a white balance abnormality image exists in the first channel image and the second channel image, the method further includes the following steps: a to-be-adjusted white balance abnormality image is determined according to a position of the first channel image and a position of the second channel image in a multi-channel image; and a color feature representative value of the to-be-adjusted white balance abnormality image is adjusted according to a color feature difference value between the to-be-adjusted white balance abnormality image and an adjacent channel. After the color feature difference value and the white balance abnormality image are determined, the adjustment of white balance may be determined according to the color feature difference value. In this manner, the white balance between multiple channels is basically the same or similar after adjustment, thereby improving the acquired multi-channel image effect.

On the basis of the above-described technical solution, in an embodiment, the color feature representative value includes a color ratio value, where a color ratio value of each target block is an average value of R/G and an average value of B/G in three primary colors of red, green and blue (RGB) of pixels in each target block, and a color ratio value of each reference block is an average value of R/G and an average value of B/G in three primary colors of RGB of pixels in each target block. The color conditions of the target block and the reference block may be expressed according to the average value of R/G and the average value of B/G. The above-described advantage is that the calculation is simple and it is beneficial to the stability of the solution.

Based on the selection effect of target blocks and reference blocks shown in FIG. 3, the technical solution of the present application is described with specific examples.

The following is described by using the block a2 in the second channel image as the target block. The similarity between a2 and each of the reference blocks b1, b2, b3 and 0 is calculated (the similarity may be calculated in various methods, which are not described herein), and the calculation results are recorded as $S_1$, $S_2$, $S_3$ and $S_4$. If the similarity is greater than the threshold Thr1, the two blocks are considered to be similar and the similarity is marked as 1, otherwise the similarity is marked as 0. The label of the similarity between the block a2 and each of four blocks b1, b2, b3 and 0 is $F_1$, $F_2$, $F_3$ and $F_4$ whose values are all 0 or 1.

The color ratio value (RGain and BGain) of a2 are calculated and recorded as $RG_0$ and $BG_0$.

$$RG_0 = \frac{1}{P \cdot Q} \sum_{p=1}^{P} \sum_{q=1}^{Q} \frac{R(p,q)}{G(p,q)}, \text{ and}$$

$$BG_0 = \frac{1}{P \cdot Q} \sum_{p=1}^{P} \sum_{q=1}^{Q} \frac{B(p,q)}{G(p,q)},$$

where R(p,q), B(p,q) and G(p,q) represent the R, B and G values of pixel points (p,q), respectively, and P and Q represent the width and height of the block a2, respectively.

Similarly, the color ratio values of four blocks b1, b2, b3 and 0 are $RG_1$ and $BG_1$, $RG_2$ and $BG_2$, $RG_3$ and $BG_3$, and $RG_4$ and $BG_4$, respectively.

Then, the weighted variance value $D_2$ of the color ratio value of the block a2 to an adjacent channel may be expressed as $$D_2 = \sum_{i=1}^{4} k_i \cdot F_i \cdot S_i \cdot \left( (RG_0 - RG_i)^2 + (BG_0 - BG_i)^2 \right),$$

where $k_i$ is the weighted coefficient, and $$\sum_{i=1}^{4} k_i = 1.$$

According to the above-described method, the weighted variance values $D_i$ of the color ratio value of the block ai in the second channel image to the adjacent channel are sequentially calculated, where i=1, 2, 3, ..., y; and then, the color ratio variance value $C_{23}$ of the second channel image and the third channel image may be expressed as $$C_{23} = \sum_{i=1}^{y} D_i \cdot m_i,$$

where $m_i$ is the weighted coefficient, and $$\sum_{i=1}^{y} m_i = 1.$$

If the variance value $C_{23}$ is greater than the threshold Thr2, the white balance of the second channel image and the white balance of the third channel image are considered to be inconsistent.

Therefore, the color ratio variance value between an $i^{th}$ channel image and adjacent channel images on both sides of the $i^{th}$ channel image is $C_i$ and $C_{i+1}$. If $C_i$ is greater than Thr2 and $C_{i+1}$ is greater than Thr2, it is considered that the white balance of the $i^{th}$ channel image has a color cast. When the $i^{th}$ channel is a channel of the most edge, if the color ratio variance value between the $i^{th}$ channel and an adjacent image channel is greater than Thr2, whether the white balance of the $i^{th}$ channel image has a color cast is determined according to whether the white balance of the adjacent channel has a color cast. If the adjacent channel has a color cast, the white balance of the adjacent channel is adjusted and then whether the white balance of the $i^{th}$ channel image has a color cast is determined. If the adjacent channel does not have a color cast, it is considered that the white balance of the $i^{th}$ channel image has a color cast.

In addition, the color ratio variance value may also be calculated in the following manner.

The color ratio variance value between the $i^{th}$ channel image and adjacent channel images on both sides of the $i^{th}$ channel image is $C_i = n_1 \cdot C_{i(i-1)} + n_2 \cdot C_{i(i+1)}$, where $n_1 + n_2 = 1$, and the values of the weighted coefficients $n_1$ and $n_2$ may be set according to the actual situation or the magnitudes of $C_{i(i-1)}$ and $C_{i(i+1)}$. When the $i^{th}$ channel is a channel of the most edge, the weighting is unnecessary. If $C_i$ is greater than Thr2, it is considered that the white balance of the $i^{th}$ channel image has a color cast.

The method for determining the color cast of a channel image is not limited to the above-described method, and the color cast may be determined by looking for a maximum value in $C_i$. If the multi-ocular camera is not arranged horizontally, for example, it is in a rectangular arrangement, the similarity between a channel image and adjacent channel images on the left and right of the channel image may be calculated, and the similarity between a channel image and adjacent channel images above and below the channel image may also be calculated. In addition, during the calculation of the color ratio variance value, the proportion of each adjacent channel image may be set according to the actual situation.

The color ratio value of the white balance abnormality channel image is adjusted in the following manner: the function of this module is to calculate the color adjustment intensity of the white balance abnormality channel image. The input is the color ratio value of a similar area of a color cast channel image and an adjacent channel image, and the output is the color correction intensity.

The following is a specific embodiment.

The specific embodiment is described still using the second channel image in FIG. 3 as an example. Assuming that the white balance of the second channel image is abnormal, $\Delta R$ and $\Delta B$ need to be adjusted to minimize the difference between the white balance of the second channel image and the white balance of the adjacent channel image. The optimal solution model min $C = C_{12} + C_{23}$ is established, where $$C_{12} = \sum_{i=1}^{y} D_{i1} \cdot m_{i1}, \; , \; C_{23} = \sum_{i=1}^{y} D_{i3} \cdot m_{i3},$$

and $$D_j = \sum_{i=1}^{4} k_i \cdot F_i \cdot S_i \cdot \left( (RG_j + \Delta R - RG_i)^2 + (BG_j + \Delta B - BG_i)^2 \right), \, j \in [1, y],$$

that is, the blocks at the edge of the second channel image, and in this manner, the color ratio adjustment intensity of the color cast channel image are ΔR and ΔB.

In the technical solution automatically, when the existence of a channel image whose white balance has a color cast is determined, the white balance and other parameters are dynamically adjusted in real time/periodically, thereby ensuring the consistency of image effects after multi-channel image splicing.

Figure 6:
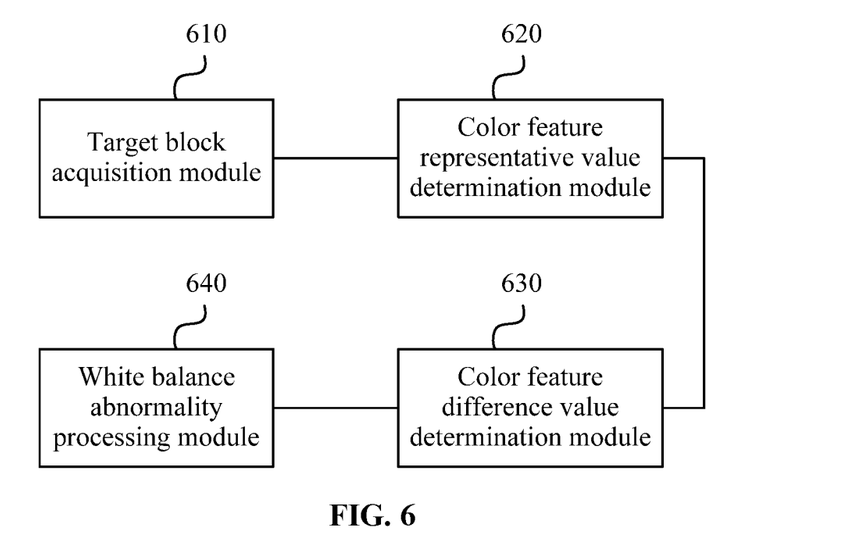
FIG. 6 is a structural schematic diagram of a white balance abnormality determination apparatus according to an embodiment of the present application.

FIG. 6 is a structural schematic diagram of a white balance abnormality determination apparatus according to an embodiment of the present application. As shown in FIG. 6, the white balance abnormality determination apparatus includes a target block acquisition module 610, a color feature representative value determination module 620, a color feature difference value determination module 630, and a white balance abnormality processing module 640.

The target block acquisition module 610 is configured to acquire at least one target block in a first channel image, and acquire at least one reference block in a second channel image for each target block, where the at least one reference block is associated with a position of a respective target block, and the first channel image is adjacent to the second channel image. The color feature representative value determination module 620 is configured to determine a color feature representative value of each target block and a color feature representative value of each reference block associated with the position of the respective target block. The color feature difference value determination module 630 is configured to determine, according to a difference between the color feature representative value of each target block and the color feature representative value of each reference block associated with the position of the respective target block, a color feature difference value between the first channel image and the second channel image. The white balance abnormality processing module 640 is configured to determine, according to a magnitude relationship between the color feature difference value and a preset threshold, whether a white balance abnormality image exists in the first channel image and the second channel image, and in a case where a white balance abnormality image exists in the first channel image and the second channel image, adjust the white balance abnormality image.

In the technical solution provided by this embodiment of the present application, at least one target block in a first channel image is acquired, and at least one reference block in a second channel image is acquired for each target block, where each reference block is associated with the position of a respective target block, and the first channel image is adjacent to the second channel image; a color feature representative value of each target block and a color feature representative value of each reference block associated with the position of the respective target block are determined; a color feature difference value between the first channel image and the second channel image is determined according to a difference between the color feature representative value of each target block and the color feature representative value of each reference block associated with the position of the respective target block; and whether a white balance abnormality image exists in the first channel image and the second channel image is determined according to a magnitude relationship between the color feature difference value and a preset threshold, and in a case where a white balance abnormality image exists in the first channel image and the second channel image, the white balance abnormality image is adjusted. Through the technical solution provided by the present application, the effect of quickly and accurately determining white balance abnormality images in the multi-channel image can be achieved, and the effect of supplementarily adjusting white balance abnormality channel images can be achieved, thereby ensuring the consistency of image effects after multi-channel image splicing.

On the basis of the above-described technical solution, in an embodiment, the color feature difference value determination module 630 includes a weighted variance value calculation unit and a color feature difference value calculation unit.

The weighted variance value calculation unit is configured to determine a weighted variance value of each target block according to the color feature representative value of each target block and the color feature representative value of each reference block associated with the position of the respective target block.

The color feature difference value calculation unit is configured to determine the color feature difference value between the first channel image and the second channel image according to weighted variance values of all of the at least one target block based on a preset rule.

On the basis of the above-described technical solution, in an embodiment, the weighted variance value calculation unit is configured to: determine a similarity between each target block and each reference block associated with the position of the respective target block; determine, according to a magnitude relationship between each similarity and a preset similarity threshold, a similarity weighted coefficient between each target block and each reference block associated with the position of the respective target block; and determine, according to the similarity between each target block and each reference block associated with the position of the respective target block, the similarity weighted coefficient between each target block and each reference block associated with the position of the respective target block, the color feature representative value of each target block, and the color feature representative value of each reference block associated with the position of the respective target block, a weighted variance value of each target block.

On the basis of the above-described technical solution, in an embodiment, the color feature difference value calculation unit is configured to: Perform weighted accumulation on the weighted variance values of all of the at least one target block, and take a result of the weighted accumulation as the color feature difference value between the first channel image and the second channel image.

On the basis of the above-described technical solution, in an embodiment, the apparatus further includes a white balance abnormality image determination module and a white balance adjustment module.

The white balance abnormality image determination module is configured to determine a to-be-adjusted white balance abnormality image according to a position of the first channel image and a position of the second channel image in a multi-channel image.

The white balance adjustment module is configured to adjust, according to a color feature difference value between the to-be-adjusted white balance abnormality image and a channel adjacent to a channel where the to-be-adjusted white balance abnormality image is located, a color feature representative value of the to-be-adjusted white balance abnormality image.

On the basis of the above-described technical solution, in an embodiment, the color feature representative value includes a color ratio value, where a color ratio value of each target block is an average value of R/G and an average value of B/G in three primary colors of RGB of pixels in each target block, and a color ratio value of each reference block is an average value of R/G and an average value of B/G in three primary colors of RGB of pixels in each target block.

The above-described product may perform the method provided by any embodiment of the present application and has function modules and beneficial effects corresponding to the method.

The embodiments of the present application further provide a storage medium including computer-executable instructions. The computer-executable instructions are used for, when executed by a computer processor, performing a white balance abnormality determination method, and the method includes the steps described below.

At least one target block in a first channel image is acquired, and at least one reference block in a second channel image is acquired for each target block, where each reference block is associated with the position of a respective target block, and the first channel image is adjacent to the second channel image; a color feature representative value of each target block and a color feature representative value of each reference block associated with the position of the respective target block are determined; a color feature difference value between the first channel image and the second channel image is determined according to a difference between the color feature representative value of each target block and the color feature representative value of each reference block associated with the position of the respective target block; and whether a white balance abnormality image exists in the first channel image and the second channel image is determined according to a magnitude relationship between the color feature difference value and a preset threshold, and in a case where a white balance abnormality image exists in the first channel image and the second channel image, the white balance abnormality image is adjusted.

The storage medium is any one of various types of memory devices or storage devices. The term "storage medium" is intended to include an installation medium, such as a compact disc read-only memory (CD-ROM) and a floppy disk or a magnetic tape apparatus; a computer system memory or a random access memory, such as a dynamic random-access memory (DRAM), a double data rate random-access memory (DDR RAM), a static random-access memory (SRAM), an extended data out random-access memory (EDO RAM) and a Rambus random-access memory (Rambus RAM); a non-volatile memory, such as a flash memory and a magnetic medium (such as a hard disk drive and an optical storage); a register or other similar types of memory elements, and the like. The storage medium may also include other types of memories or combinations thereof. In addition, the storage medium may be located in a computer system in which programs are executed, or may be located in a different second computer system connected to the computer system through a network (such as the Internet). The second computer system may provide program instructions to a computer for execution. The term "storage medium" may include two or more storage media which can reside at different positions (such as in different computer systems connected through a network). The storage medium may store program instructions (for example, program instructions that are embodied as computer programs) which are executable by one or more processors.

The computer-executable instructions included in the storage medium provided by the embodiment of the present application are not limited to perform the operation of determining white balance abnormality as described above, and may also perform related operations in the white balance abnormality determination method provided by any embodiment of the present application.

Figure 7:
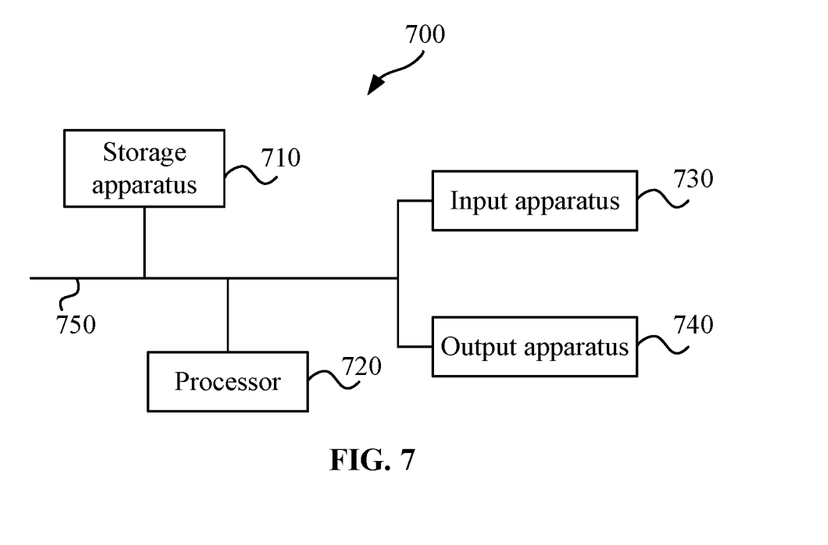
FIG. 7 is a structural schematic diagram of an electronic device according to an embodiment of the present application.

The embodiments of the present application provide an electronic device into which the white balance abnormality determination apparatus provided by the embodiments of the present application may be integrated. FIG. 7 is a structural schematic diagram of an electronic device according to an embodiment of the present application. As shown in FIG. 7, this embodiment provides an electronic device 700, which includes: one or more processors 720 and a storage apparatus 720 which is configured to store one or more programs. The one or more programs, when executed by the one or more processors 720, cause the one or more processors 720 to perform the whiter balance abnormality determination method, and the method includes the steps described below.

At least one target block in a first channel image is acquired, and at least one reference block in a second channel image is acquired for each target block, where each reference block is associated with the position of a respective target block, and the first channel image is adjacent to the second channel image; a color feature representative value of each target block and a color feature representative value of each reference block associated with the position of the respective target block are determined; a color feature difference value between the first channel image and the second channel image is determined according to a difference between the color feature representative value of each target block and the color feature representative value of each reference block associated with the position of the respective target block; and whether a white balance abnormality image exists in the first channel image and the second channel image is determined according to a magnitude relationship between the color feature difference value and a preset threshold, and in a case where a white balance abnormality image exists in the first channel image and the second channel image, the white balance abnormality image is adjusted.

The processor 720 further performs the technical solutions of the white balance abnormality determination method provided by the embodiments of the present application.

The electronic device displayed in FIG. 7 is just an example and is not intended to limit the functions and the usage scope of the embodiments of the present application.

As shown in FIG. 7, the electronic device 700 includes a processor 720, a storage apparatus 710, an input apparatus 730, and an output apparatus 740. The number of processors 720 in the electronic device may be one or more, and FIG. 7 is illustrated using one processor 720 as an example. The processor 720, the storage apparatus 710, the input apparatus 730, and the output device apparatus 740 in the electronic device may be connected via a bus or in other manners, with the connection via a bus 750 as an example in FIG. 7.

As a computer-readable storage medium, the storage apparatus 710 may be configured to store software programs and computer executable programs and modules, such as program instructions/modules corresponding to the white balance abnormality determination method in the embodiments of the present application.

The storage apparatus 710 may mainly include a program storage region and a data storage region. The program storage region may store an operating system and an application program required for at least one function, and the data storage region may store data or the like created according to the use of the terminal. Additionally, the storage apparatus 710 may include a high-speed random-access memory, and may further include a non-volatile memory such as at least one disc storage device, a flash memory or other non-volatile solid-state memories. In some examples, the storage apparatus 710 may include memories which are remotely disposed with respect to the processors 720. These remote memories may be connected to the terminal via a network. The examples of the preceding network include, but are not limited to, the Internet, an intranet, a local area network, a mobile communication network, and a combination thereof.

The input apparatus 730 may be configured to receive inputted digital, character or speech information and generate key signal input related to user settings and function control of the electronic device. The output apparatus 740 may include display devices such as display screens and speakers.

As shown in FIG. 7, the electronic device 700 includes a processor 720, a storage apparatus 710, an input apparatus 730, and an output apparatus 740. The number of processors 720 in the electronic device may be one or more, and FIG. 7 is illustrated using one processor 720 as an example. The processor 720, the storage apparatus 710, the input apparatus 730, and the output device apparatus 740 in the electronic device may be connected via a bus or in other manners, with the connection via a bus 750 as an example in FIG. 7.

As a computer-readable storage medium, the storage apparatus 710 may be configured to store software programs and computer executable programs and modules, such as program instructions/modules corresponding to the white balance abnormality determination method in the embodiments of the present application.

The storage apparatus 710 may mainly include a program storage region and a data storage region. The program storage region may store an operating system and an application program required for at least one function, and the data storage region may store data or the like created according to the use of the terminal. Additionally, the storage apparatus 710 may include a high-speed random-access memory, and may further include a non-volatile memory such as at least one disc storage device, a flash memory or other non-volatile solid-state memories. In some examples, the storage apparatus 710 may include memories which are remotely disposed with respect to the processors 720. These remote memories may be connected to the terminal via a network. The examples of the preceding network include, but are not limited to, the Internet, an intranet, a local area network, a mobile communication network, and a combination thereof.

The input apparatus 730 may be configured to receive inputted digital, character or speech information and generate key signal input related to user settings and function control of the electronic device. The output apparatus 740 may include display devices such as display screens and speakers.

What is claimed is:

1. A white balance abnormality determination method, comprising:
　　acquiring at least one target block in a first channel image, and acquiring at least one reference block in a second channel image for each target block, wherein the at least one reference block is associated with a position of a respective target block, and the first channel image is adjacent to the second channel image;
　　determining a color feature representative value of each target block and a color feature representative value of each reference block associated with the position of the respective target block;
　　determining, according to a difference between the color feature representative value of each target block and the color feature representative value of each reference block associated with the position of the respective target block, a color feature difference value between the first channel image and the second channel image; and
　　determining, according to a magnitude relationship between the color feature difference value and a preset threshold, whether a white balance abnormality image exists in the first channel image and the second channel image, and in a case where a white balance abnormality image exists in the first channel image and the second channel image, adjusting the white balance abnormality image.

2. The method according to claim 1, wherein the determining, according to a difference between the color feature representative value of each target block and the color feature representative value of each reference block associated with the position of the respective target block, a color feature difference value between the first channel image and the second channel image comprises:
　　determining, according to the color feature representative value of each target block and the color feature representative value of each reference block associated with the position of the respective target block, a weighted variance value of each target block; and
　　determining, according to weighted variance values of all of the at least one target block, the color feature difference value between the first channel image and the second channel image based on a preset rule.

3. The method according to claim 2, wherein the determining, according to the color feature representative value of each target block and the color feature representative value of each reference block associated with the position of the respective target block, a weighted variance value of each target block comprises:
　　determining a similarity between each target block and each reference block associated with the position of the respective target block;
　　determining, according to a magnitude relationship between the similarity between each target block and each reference block associated with the position of the respective target block and a preset similarity threshold, a similarity weighted coefficient between each target block and each reference block associated with the position of the respective target block is determined; and
　　determining, according to the similarity between each target block and each reference block associated with the position of the respective target block, the similarity weighted coefficient between each target block and each reference block associated with the position of the respective target block, the color feature representative value of each target block, and the color feature representative value of each reference block associated with the position of the respective target block, a weighted variance value of each target block.

4. The method according to claim 2, wherein the determining, according to weighted variance values of all of the at least one target block, the color feature difference value between the first channel image and the second channel image based on a preset rule comprises:
　　performing weighted accumulation on the weighted variance values of all the at least one target block, and taking a result of the weighted accumulation as the color feature difference value between the first channel image and the second channel image.

5. The method according to claim 1, wherein the adjusting the white balance abnormality image comprises:
  determining a to-be-adjusted white balance abnormality image according to a position of the first channel image in a multi-channel image and a position of the second channel image in a multi-channel image; and
  adjusting, according to a color feature difference value between the to-be-adjusted white balance abnormality image and a channel adjacent to a channel where the to-be-adjusted white balance abnormality image is located, a color feature representative value of the to-be-adjusted white balance abnormality image.

6. The method according to claim 1, wherein the color feature representative value comprises a color ratio value;
  wherein a color ratio value of each target block is an average value of R/G and an average value of B/G in three primary colors of red, green and blue (RGB) of pixels in each target block, and a color ratio value of each reference block is an average value of R/G and an average value of B/G in three primary colors of RGB of pixels in each target block.

7. A white balance abnormality determination apparatus, comprising:
  a processor and a memory storing processor-executable instructions which, when executed by the processor, are configured to acquire at least one target block in a first channel image, and acquire at least one reference block in a second channel image for each target block, wherein the at least one reference block is associated with a position of a respective target block, and the first channel image is adjacent to the second channel image;
  determine a color feature representative value of each target block and a color feature representative value of each reference block associated with the position of the respective target block;
  determine, according to a difference between the color feature representative value of each target block and the color feature representative value of each reference block associated with the position of the respective target block, a color feature difference value between the first channel image and the second channel image; and
  determine, according to a magnitude relationship between the color feature difference value and a preset threshold, whether a white balance abnormality image exists in the first channel image and the second channel image, and in a case where a white balance abnormality image exists in the first channel image and the second channel image, adjust the white balance abnormality image.

8. The apparatus according to claim 7, wherein the determine, according to a difference between the color feature representative value of each target block and the color feature representative value of each reference block associated with the position of the respective target block, a color feature difference value between the first channel image and the second channel image comprises:
  determining, according to the color feature representative value of each target block and the color feature representative value of each reference block associated with the position of the respective target block, a weighted variance value of each target block; and
  determining, according to weighted variance values of all of the at least one target block, the color feature difference value between the first channel image and the second channel image based on a preset rule.

9. A non-transitory computer-readable storage medium storing a computer program, wherein the computer program, when executed by a processor, performs the white balance abnormality determination method according to claim 1.

10. An electronic device, comprising a memory, a processor, and a computer program stored on the memory and executable by the processor, wherein the processor performs the white balance abnormality determination method according to claim 1 when executing the computer program.

11. The apparatus according to claim 8, wherein the determining, according to the color feature representative value of each target block and the color feature representative value of each reference block associated with the position of the respective target block, a weighted variance value of each target block comprises:
  determining a similarity between each target block and each reference block associated with the position of the respective target block;
  determining, according to a magnitude relationship between the similarity between each target block and each reference block associated with the position of the respective target block and a preset similarity threshold, a similarity weighted coefficient between each target block and each reference block associated with the position of the respective target block is determined; and
  determining, according to the similarity between each target block and each reference block associated with the position of the respective target block, the similarity weighted coefficient between each target block and each reference block associated with the position of the respective target block, the color feature representative value of each target block, and the color feature representative value of each reference block associated with the position of the respective target block, a weighted variance value of each target block.

12. The apparatus according to claim 8, wherein the determining, according to weighted variance values of all of the at least one target block, the color feature difference value between the first channel image and the second channel image based on a preset rule comprises:
  performing weighted accumulation on the weighted variance values of all the at least one target block, and taking a result of the weighted accumulation as the color feature difference value between the first channel image and the second channel image.

13. The apparatus according to claim 7, wherein the adjust the white balance abnormality image comprises:
  determining a to-be-adjusted white balance abnormality image according to a position of the first channel image in a multi-channel image and a position of the second channel image in a multi-channel image; and
  adjusting, according to a color feature difference value between the to-be-adjusted white balance abnormality image and a channel adjacent to a channel where the to-be-adjusted white balance abnormality image is located, a color feature representative value of the to-be-adjusted white balance abnormality image.

14. The apparatus according to claim 7, wherein the color feature representative value comprises a color ratio value;
  wherein a color ratio value of each target block is an average value of R/G and an average value of B/G in three primary colors of red, green and blue (RGB) of pixels in each target block, and a color ratio value of each reference block is an average value of R/G and an average value of B/G in three primary colors of RGB of pixels in each target block.

15. The non-transitory computer-readable storage medium according to claim 9, wherein the determining, according to a difference between the color feature representative value of each target block and the color feature representative value of each reference block associated with the position of the respective target block, a color feature difference value between the first channel image and the second channel image comprises:
  determining, according to the color feature representative value of each target block and the color feature representative value of each reference block associated with the position of the respective target block, a weighted variance value of each target block; and
  determining, according to weighted variance values of all of the at least one target block, the color feature difference value between the first channel image and the second channel image based on a preset rule.

16. The non-transitory computer-readable storage medium according to claim 15, wherein the determining, according to the color feature representative value of each target block and the color feature representative value of each reference block associated with the position of the respective target block, a weighted variance value of each target block comprises:
  determining a similarity between each target block and each reference block associated with the position of the respective target block;
  determining, according to a magnitude relationship between the similarity between each target block and each reference block associated with the position of the respective target block and a preset similarity threshold, a similarity weighted coefficient between each target block and each reference block associated with the position of the respective target block is determined; and
  determining, according to the similarity between each target block and each reference block associated with the position of the respective target block, the similarity weighted coefficient between each target block and each reference block associated with the position of the respective target block, the color feature representative value of each target block, and the color feature representative value of each reference block associated with the position of the respective target block, a weighted variance value of each target block.

17. The non-transitory computer-readable storage medium according to claim 15, wherein the determining, according to weighted variance values of all of the at least one target block, the color feature difference value between the first channel image and the second channel image based on a preset rule comprises:
  performing weighted accumulation on the weighted variance values of all the at least one target block, and taking a result of the weighted accumulation as the color feature difference value between the first channel image and the second channel image.

18. The non-transitory computer-readable storage medium according to claim 9, wherein the adjusting the white balance abnormality image comprises:
  determining a to-be-adjusted white balance abnormality image according to a position of the first channel image in a multi-channel image and a position of the second channel image in a multi-channel image; and
  adjusting, according to a color feature difference value between the to-be-adjusted white balance abnormality image and a channel adjacent to a channel where the to-be-adjusted white balance abnormality image is located, a color feature representative value of the to-be-adjusted white balance abnormality image.

19. The non-transitory computer-readable storage medium according to claim 9, wherein the color feature representative value comprises a color ratio value;
  wherein a color ratio value of each target block is an average value of R/G and an average value of B/G in three primary colors of red, green and blue (RGB) of pixels in each target block, and a color ratio value of each reference block is an average value of R/G and an average value of B/G in three primary colors of RGB of pixels in each target block.

20. The electronic device according to claim 10, wherein the determining, according to a difference between the color feature representative value of each target block and the color feature representative value of each reference block associated with the position of the respective target block, a color feature difference value between the first channel image and the second channel image comprises:
  determining, according to the color feature representative value of each target block and the color feature representative value of each reference block associated with the position of the respective target block, a weighted variance value of each target block; and
  determining, according to weighted variance values of all of the at least one target block, the color feature difference value between the first channel image and the second channel image based on a preset rule.

* * * * *